United States Patent [19]

Seeber

[11] Patent Number: 4,595,068
[45] Date of Patent: Jun. 17, 1986

[54] TRANSMISSION APPARATUS

[76] Inventor: Fritz Seeber, 6731 Elmstein-Helmbach, Fed. Rep. of Germany

[21] Appl. No.: 526,037

[22] Filed: Aug. 24, 1983

[30] Foreign Application Priority Data

Aug. 25, 1982 [DE] Fed. Rep. of Germany ....... 3231477

[51] Int. Cl.⁴ .......................................... B62D 55/116
[52] U.S. Cl. .................. 180/9.52; 74/99 R; 180/9.28
[58] Field of Search ............... 74/99 R, 108; 180/9.28, 180/9.52, 89.13

[56] References Cited

U.S. PATENT DOCUMENTS

| | | | |
|---|---|---|---|
| 2,569,005 | 9/1951 | Kindling | 74/99 X |
| 3,012,443 | 12/1961 | Ljungstrom | 74/108 X |
| 3,329,030 | 7/1967 | Dijkhof | 74/108 X |

FOREIGN PATENT DOCUMENTS 636228 4/1950 United Kingdom ............... 180/9.52

Primary Examiner—Martin P. Schwadron
Assistant Examiner—Stephen M. Hepperle
Attorney, Agent, or Firm—Toren, McGeady, Stanger, Goldberg & Kiel

[57] ABSTRACT

A transmission apparatus converts rotational motion into technically linear motion and can be used for vertically displacing wheels or tracks on an off-the-road vehicle. The transmission apparatus includes at least one stationarily mounted control disk with at least a circular arc section on its circumferential periphery and at least one eccentric disk connected to the control disk by a drive device. The eccentric disk has a circular circumferential periphery and an eccentric point from its center point. The eccentric disk is rotatably connected to one end of an elongated rocker arm. The other end of the rocker arm is pivotally connected to the control disk at a point on a straight line extending between the center of curvature of the circumferential periphery of the control disk and the disengaging point of the drive member from the circumferential periphery of the control disk in the neutral position of the eccentric disk. The combination of the control disk, eccentric disk and rocker arm can be repeated in forming the transmission apparatus. On the vehicle, the transmission apparatus is mounted on a central pin and the rocker arm can be displaced by a hydraulic cylinder.

8 Claims, 8 Drawing Figures

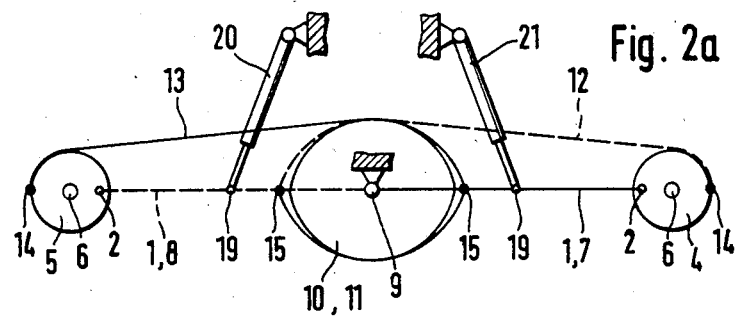
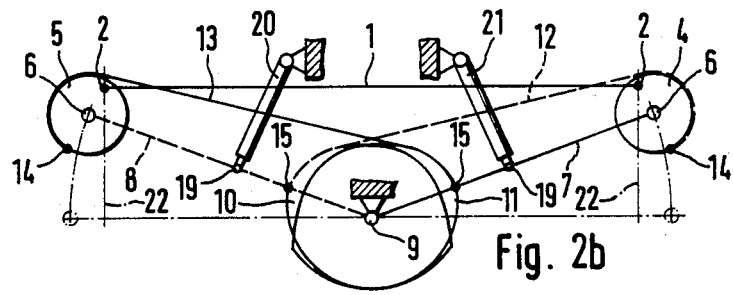
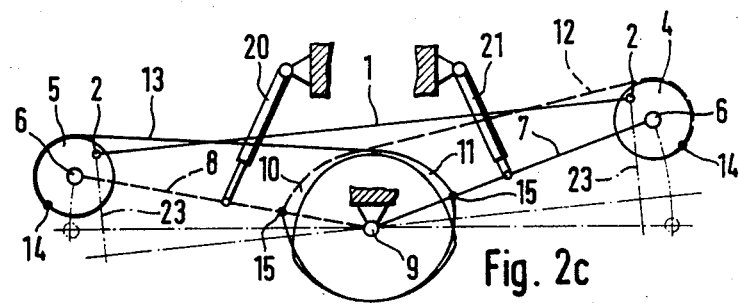

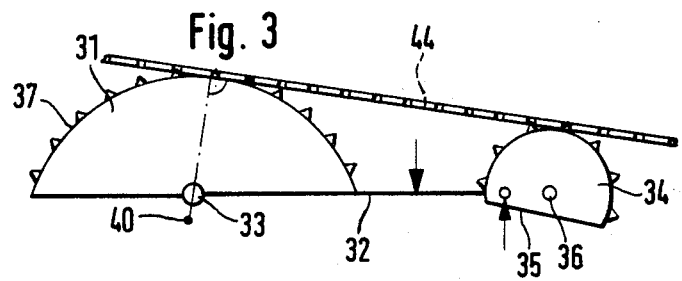
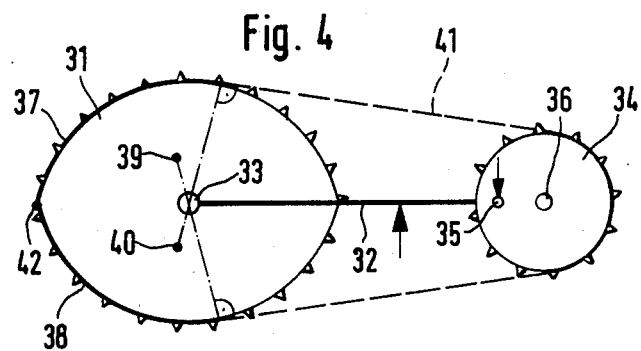
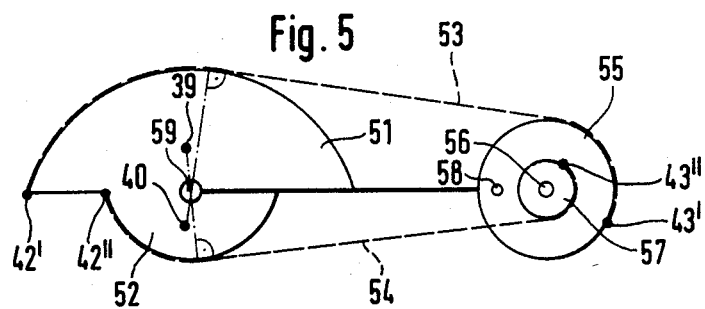

TRANSMISSION APPARATUS

SUMMARY OF THE INVENTION

The present invention is directed to a motion transmission apparatus and to a special embodiment of such apparatus.

In the field of motion transmission it is often necessary to convert rotational motion such as motion along a circular arc section, into linear motion. The basis for the development of such transmission apparatus are the so-called Cardanic circles which afford a hypocycloidal straight-line motion. This known linear movement, however, passes through the midpoint of the larger circle of the Cardanic circles.

Therefore, the primary object of the present invention is to provide a transmission apparatus in which movement along a circular arc can be converted into linear movement, such as a lifting or lowering movement, at a desired distance from the center of the arc movement.

In accordance with the present invention, the transmission apparatus in its smallest arrangement includes a control disk mounted stationarily and having a circular arc section on its circumferential periphery along with an eccentric disk with a circular circumferential periphery. The eccentric disk has an eccentric point spaced from its center point. The control disk and eccentric disk are interconnected by a drive means. A rocker arm extends between the control disk and the eccentric disk with the center of the eccentric disk being rotatably supported on one end of the rocker arm. The other end of the rocker arm is pivotally mounted about a pivot axis located on a straight line extending between the center of curvature of the circular arc section on the circumferential periphery of the control disk and a first contact or disengagement point of the drive means with the circumferential periphery of the control disk when the eccentric disk is in a neutral position. The motion transmission afforded is dependent on the relationship of the dimension of the rocker arm between its ends and the distance between the center point and the eccentric point on the eccentric disk.

The individual parameters which afford the straight-like movement of the eccentric point on the eccentric disk, can be determined in accordance with the particular application, especially with regard to predetermined sizes and dimensions. A particular advantage is that all bearings can be pivot bearings, sliding bearings are not necessary.

In a simple manner, the drive means can be a belt or a cable.

Further, the drive means may be a toothed belt or a chain with the eccentric disk formed as a toothed wheel or a chain wheel.

Moreover, it is also possible to utilize a toothed rack as the drive means. In such an arrangement, the eccentric disk as well ass the control disk, must be provided with a toothed circumferential periphery. Use of a toothed rack as the drive means has the particular advantage that it is capable of withstanding both tension and compression stress.

The basic form of the transmission apparatus described above may be further developed. In a first development, a mirror-inverted and symmetrical duplication of the control and eccentric disks is provided. In another development, where plural of the disks may be used.

In one application, a double transmission apparatus combines two rocker arms with the associated disks where a different control disk is connected to each rocker arm and, in turn, drives the eccentric disk mounted on the opposite end of the rocker arm. The transmission ratio of the control disk to the eccentric disk is thus halved. In such a transmission apparatus, there is constant distance between the eccentric points. During symmetrical movement of the two rocker arms, the eccentric points execute parallel vertical movements. When only one rocker arm is moved, the associated eccentric point effects a circular movement around the other eccentric point. With this arrangement, desired intermediate positions of the two rocker arms are also possible.

The eccentric points on two separate eccentric disks can be connected with a single rigid carrier, each via a pivot bearing, so that a constant distance between the two eccentric points is established independent of the movement of the rocker arms. The movement of the rocker arms can be performed symmetrically or unsymmetrically, as desired, either upwardly or downwardly.

One example of a double transmission apparatus is in an off-the-road vehicle.

Such a vehicle can be of the caterpillar type, though it could be equipped with a plurality of wheels on each side. To achieve the desired movements of the wheels on both sides of the vehicle, the wheels can be displaced in the vertical direction and also they can be pivoted horizontally so that the transmission apparatus of the present invention is employed advantageously.

Such an off-the-road vehicle has two laterally arranged rigid carriers acting as track or wheel carriers and extending in the long direction. The carriers are equipped with connecting pins in their end areas spaced apart in the long direction and an eccentric disk is rotatable supported at an eccentric point on each of the connecting pins. In addition, the eccentric disks are rotatably supported at points spaced from the eccentric points on the ends of the rocker arms spaced from the control disks. Each of the rocker arms is pivotally mounted on a different control disk and the control disks are fixed to a common central pin fastened to the vehicle chassis. The drive means connects the eccentric disk of one rocker arm with the control disk of the other rocker arm. Piston rods in hydraulic cylinders of a hydraulic control system engage the rocker arms. The hydraulic cylinders are also pivotally secured on the vehicle chassis.

When the rocker arms pivot on the control disks around the central pin, the eccentric points on the eccentric disks or the connection points to the eccentric disks execute movements so that the distance between the connecting pins always remain the same. In such a vehicle, the side wheel or track arrangements can be displaced and pivoted upwardly and downwardly through a relatively great area, independently of one another, without the distance between the wheel axes changing relative to one another.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 2a is a schematic showing of the double transmission apparatus of FIG. 1 in the neutral position;

FIG. 2b is a schematic showing of the double transmission apparatus of FIG. 1 with the rocker arms pivoted symmetrically;

FIG. 2c is a schematic showing of the double transmission apparatus of FIG. 1 with the rocker arms pivoted unsymmetrically;

FIG. 3 is a schematic illustration of the transmission apparatus in its simplest form;

FIG. 4 is a schematic illustration of the transmission apparatus of FIG. 3 in a mirror-inverted and symmetrical duplication of the control disk and eccentric disk;

FIG. 5 is a schematic illustration of the transmission apparatus of FIG. 3 with an unsymmetrical duplication of the control disk and the eccentric disk.

DETAILED DESCRIPTION OF THE INVENTION

Since the construction and operation of the transmission apparatus embodying the present invention can best be described based on the caterpillar-type vehicle mentioned above, initially the track assembly for such a vehicle will be described. The vehicle is not shown in detail. It has the same arrangement shown in FIG. 1 on the opposite sides of its chassis.

Figure 1:
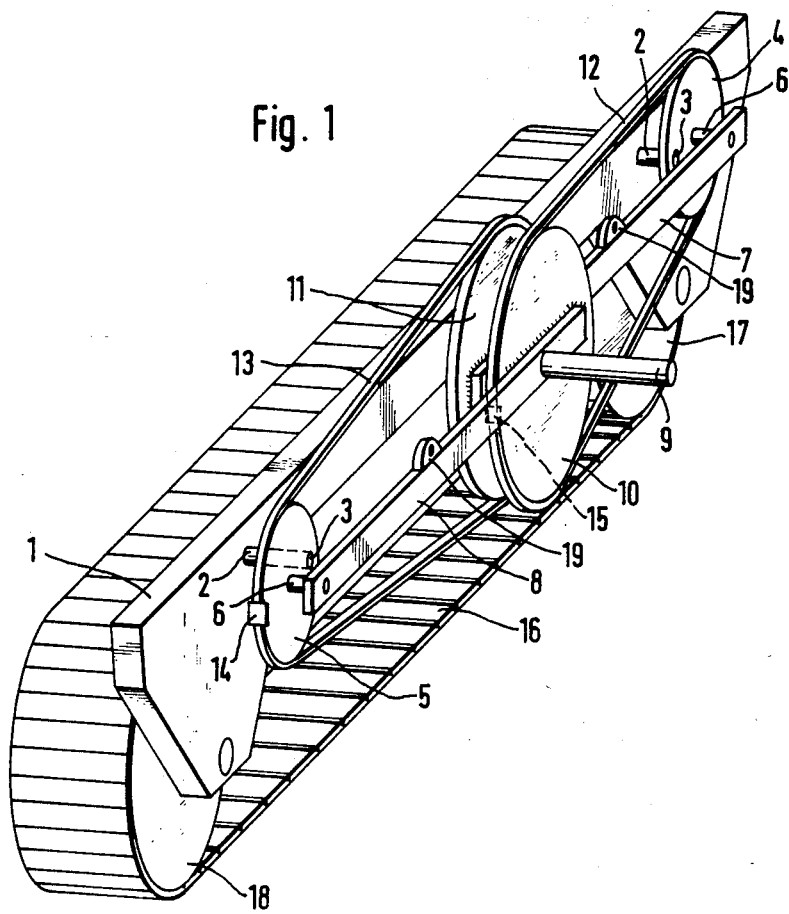
FIG. 1 is a schematic perspective view of a double transmission apparatus in a caterpillar-type vehicle.

In FIG. 1 an elongated rigid carrier 1 supports the track wheels 17, 18. Track 16 extends around the wheels. It must be possible to lower the track and wheels below the lower side of the vehicle, to raise the track and wheels above the upper side of the vehicle and to swing them horizontally around the transverse axis of the vehicle. Such movements are required for the off-the-road movement of the caterpillar-type vehicle.

Connecting pins 2 are located in the opposite end areas, of the carrier 1 and engage in eccentrically arranged holes 3 in each of the eccentric disks 4, 5. Each eccentric disk 4, 5 is rotatable around a pin 6 located at one end of a rocker arm 7, 8. The rocker arms 7, 8 are elongated in the long direction of the carrier 1 and the opposite ends of the arms from the eccentric disks are pivotally mounted on a central pin 9 with each rocker arm being secured to a different control disk 10, 11. The control disks 10, 11 are rotatable about the central pin 9. Two separate drives 12, 13 are provided with drive 12 extending between the eccentric disk 4 and the control disk 10 and drive 13 extending between eccentric disk 5 and control disk 11. As can be seen in FIG. 1, while the drive 12 connects the disks 4, 10, the rocker arm 8 connected to the disk 10 is connected at its other end to the eccentric disk 5. The converse is true for the disks 5 and 11 where the rocker arm connected to the control disk 11 is connected at its other end to the eccentric disk 4. The drives may be in the form of cables, chains or belts. For the sake of clarity, fastening points 14, 15 for the drives 12, 13 to the control disks and the eccentric disks are only shown on the eccentric disk 5 and the control disk 10. These fastening points are positioned at corresponding locations on the eccentric disk 4 and the control disk 11. The drives 12, 13 extend completely around the associated disks. The drives have disengagement points with the circumferential periphery of the disks where the drives cease contact with the disks as they extend toward the other disk.

In the illustrated embodiment, the crawler track 16 has two drive and turning wheels 17, 18. It is possible, however, to provide the carrier 1 with a plurality of wheels, preferably three.

Attachment points 19 for piston rods of two hydraulic cylinders 20, 21, note FIGS. 2a, 2b and 2c, are located on each rocker arm 7, 8. The hydraulic cylinders, 20, 21 are attached to the vehicle chassis, as is the central pin 9. The hydraulic cylinders form part of the hydraulic system for the vertical adjustment and horizontal pivoting of the wheels and crawler tracks.

FIGS. 2a–c illustrate three selected typical positions of the individual parts of the transmission assembly in the double transmission assembly of FIG. 1. In the embodiment of FIGS. 2a–c a restoring action is possible by force of gravity or by means of springs (not shown). Initially, the transmission assembly is displayed in the horizontal neutral position in FIG. 2a. The two rocker arms 7, 8 are aligned in a straight line. When the rocker arms 7, 8 are pivoted symmetrically in the upward direction, as in FIG. 2b, by means of the pistons in the hydraulic cylinders 20, 21, the control disks 10, 11 rotate around the central pin 9. In turn, the eccentric disks 4, 5 each rotate around a centrally located pin 6 due to the encircling drives 12, 13. The eccentric points 3 and the connecting pins in engagement with the eccentric points or holes, execute straight-line parallel movements. When the two rocker arms 7, 8 are pivoted unsymmetrically in the upward direction, as in FIG. 2c, the eccentric points 3 execute complicated path curves. For example, the eccentric points 3 of the right-hand eccentric disk 4 describe a circular movement around the eccentric point 3 of the left-hand eccentric disk 5, so that a linear movement is superimposed on the circular movement. A corresponding movement takes place for the eccentric point 3 of the left-hand eccentric disk 5 with respect to the eccentric point 3 of the right-hand eccentric disk 4. Surprisingly, however, the distance between the eccentric points 3 of the two eccentric disks 4, 5 remains constant even during the unsymmetrical pivot movement, whereby the eccentric points 3 and the connecting points 2 remain in the same position relative to the rigid carrier 1.

FIG. 3 shows the simplest form of the transmission apparatus embodying the present invention. A fixed control disk 31 having a toothed circle section 37, is spaced from an eccentric disk 34 also haivng a toothed circle section and, containing an eccentric borehole 35. The eccentric disk 34 is rotatable around an axis 36 located at the adjacent end of a rocker arm 32. A toothed rack 44 connects the control disk 31 and the eccentric disk 34. In this embodiment, the drive 44 does not enclose the disks. A restoring action on this arrangement is possible by the force of gravity or by means of a spring (not shown) and the capability of the toothed rack 44 of withstanding both tension and compression stress.

In FIG. 4 the control disk 31' is made up of two toothed circle sections 37, 38. The center points 39, 40 of the periphery of the sections 37, 38 do not lie on the center 33 of the control disk 31' where the rocker arm 32 is pivotally mounted. In this embodiment control disk 31' is a mirror symmetrical duplication of the control disk 10, 11 of FIG. 2. The pivot axis 33 of the rocker arm 32 is located along the straight lines extending between the centers of curvature 39, 40 of the circumferential periphery of the toothed circle sections 37, 38 and the point where the drive 41 disengages from the control disk 31.

Both halves of the disks 31', 34 are connected to the encircling drive 21 in this embodiment being a chain. The fastening point of the encircling chain 41 to the disk 31 is shown at 42.

Another embodiment of the transmission apparatus is shown in FIG. 5 where the parts of the control disk are not symmetrical, that is, the lower control disk part is smaller than the upper control disk part. This arrangement can be advantageous when employed in a vehicle if a correspondingly greater road clearance is required.

The upper control disk part 51 and the lower control disk part 52 each has a different radius. The eccentric disk is also made up of two parts 55, 57 with the eccentric disk part 55 having a larger radius and the eccentric disk part 57 having a smaller radius and with the parts having a common center point 56. The larger disk 51, 55 are connected by a belt drive 53 while the smaller disk parts 52, 57 are connected by another belt drive 54. The control disk parts 51, 52 pivot about a center point 59 and the eccentric disk parts 55, 57 pivot about a center point 56. The eccentric disk parts 55, 57 have an eccentric point 58. The belts 53, 54 are fixed to the disks 51, 52 respectively, at fastening points 42', 42" and 43', 43", respectively.

In the embodiments illustrated in FIGS. 1, 2a, 2b and 2c the different parts are fastened to one another so that a first and a second eccentric disk, respectively, are interconnected to a first and a second control disk, respectively, by a drive and, at the same time, the rocker arm connected to the first eccentric disk is fixed to the second control disk. This arrangement affords a form-locking connection between the rocker arms through they can be otherwise freely pivoted around the central pin. Due to the special construction of the control disks, the distance between the connecting pins does not change with the rocker arm positions, and this unchanging distance is a prerequisite for securing the connecting pins of the transmission apparatus to the carrier. During symmetrical pivoting of the two rocker arms, the connecting pins move in a straight line. This straight-line movement is not mathematically exact, however, the differences from a straight line are far below the tolerances required in technical constructions. In practice, it may be considered that a straight line movement is effected, since such variations can be further reduced by small corrections in the contour of the control disks and/or eccentric disks. If it is assumed that the circumferential periphery of the control disk and is the eccentric disk is circular, the dimensions of the disks can be graphically determined. This is demonstrated with the aid of FIG. 6.

With reference to FIG. 3, a control disk 31 is illustrated which is in a stationary position. A rocker arm 32 is pivoted at one end around the center point 33 of the control disk 31, that is the center point relative to the circular arc section defining the circumferential periphery of the control disk. Spaced from the control disk 31 is an eccentric disk 34 pivotally supported at the other end of the rocker arm 33 so that it can be rotated about its center point 36, that is, the center point relative to the circular circimferential periphery of the eccentric disk. The center points 33, 36 of control disk 31 and eccentric disk 34 are spaced apart by a distance a.

Eccentric point 35 on eccentric disk 34 is spaced a distance c from the center point 36. Control disk 31 and eccentric disk 34 are interconnected by a drive 41.

Figure 6:
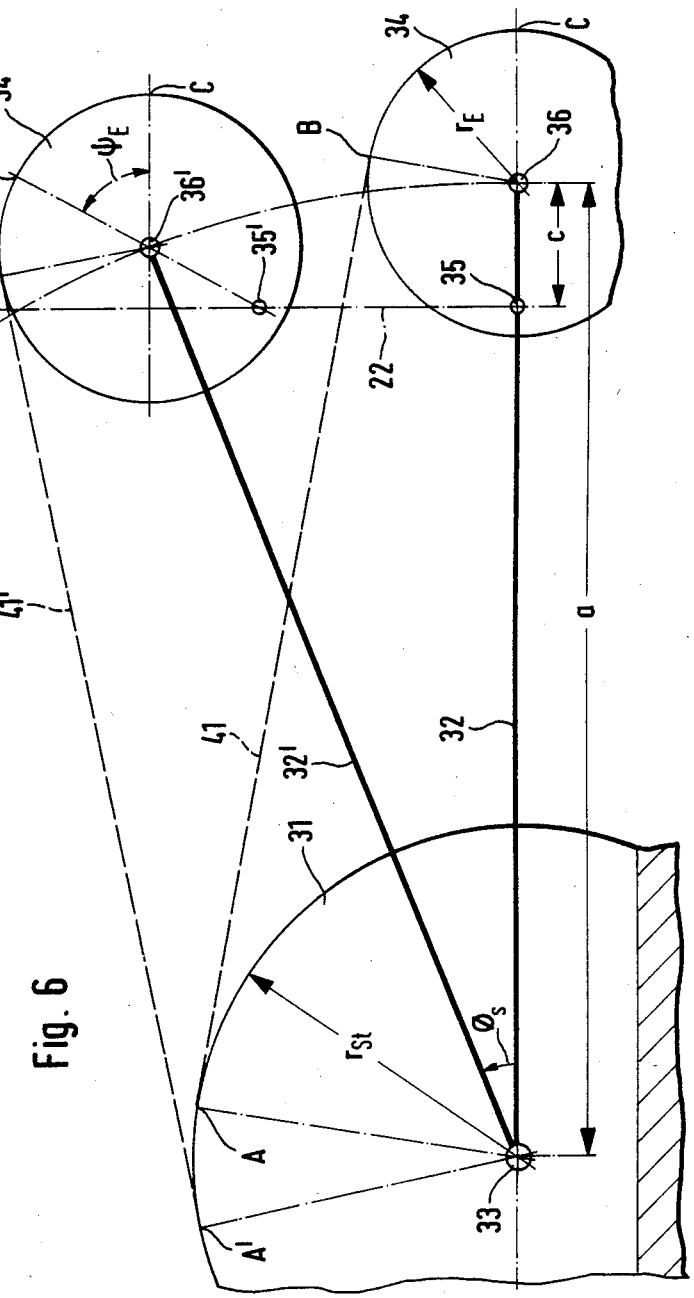
FIG. 6 is a schematic showing of the graphic determination of the dimensions of the control disk and eccentric disk based on the rocker arm length and the eccentric dimension of the eccentric disk.

Moreover, FIG. 6 shows rocker arm 32' pivoted in the upward direction at an angle $\phi_s$ relative to the neutral position shown by the rocker arm 32. In the neutral position the center line or axis of the rocker arm 32 passes through the eccentric point 35 and the center point 36 of the eccentric disk. The eccentric disk 34' is located at the end of the rocker arm and due to the movement of the rocker arm the eccentric disk has rotated about its center point 36' by an angle $\psi_E$.

At the same time, the eccentric point 35' has pivoted through an angle $\psi_E$ with regard to the neutral position of the eccentric point 35. During the rotational movement of the eccentric disk 34' the eccentric point 35 moves along the path curve 22 which extends perpendicularly relative to the rocker arm 32 in the neutral position.

The drive 41 disengages from the circumferential periphery of the disks 31, 34 in a tangential manner in each angle $\phi_E$ of the rocker arm 32. This angular position is shown on the control disk 31 between the points A and A' and at the eccentric disk between the points B and B'.

Assuming that the dimensions a and c and also, as the case may be, the radius $r_E$ of the eccentric disk are predetermined, the radius $r_{St}$ of the control disk can be established. It must be provided that the circular arc C—C' corresponding to the rotation of the eccentric disk 34' at the angle $\psi_E$, is equal to the arc A—A' with respect to the rotation of the rocker arm 32' at the angle $\phi_s$.

When applied to a double transmission apparatus, the radius $r_{St}$ of the control disk 31 can be expressed mathematically by means of the following differential equation:

$$r_{St} = r_E/2 \cdot d\psi_E/d\phi_s$$

The solution of this differential equation leads to the following equation:

$$r_{St} = \tfrac{1}{2}\left( C + \frac{a \cdot c \cdot \sin\phi_s}{\sqrt{C^2 - ((a-c) - a\cos\phi_s)^2}} \right).$$

While specific embodiments of the invention have been shown and described in detail to illustrate the application of the inventive principles, it will be understood that the invention may be embodied otherwise without departing from such principles.

I claim:

1. Transmission apparatus for converting rotational motion into linear motion comprising a control disk having a circumferental periphery defining at least a circular arc section with said circular arc section having a center point, an eccentric disk spaced from said control disk and having a circular circumferential periphery, said eccentric disk having a center point and an eccentric point spaced from said center point, said eccentric disk having a neutral position relative to said control disk, drive means for interconnecting the circumferential periphery of said control disk and the circumferential periphery of said eccentric disk for transferring motion therebetween, said drive means being in engagement with the circumferential periphery of said control disk and said eccentric disk and having a disengaging point with each of said control disk and eccentric disk, a rocker arm having a first end and a second end, said rocker arm extending between said control disk and said eccentric disk with the center point of said eccentric disk rotatably mounted on the second end of said rocker arm, the first end of said rocker arm is pivotally mounted about a pivot axis on said control disk with the pivot axis located on a straight line connecting the center point of said circular arc section of said control disk and the disengaging point of said drive means with the circumferential periphery of said control disk in the neutral position of said eccentric disk, a first and a second conrol disk in side-by-side relation on a common axis, a first and a second said eccentric disk with said eccentric disks located laterally outwardly on opposite sides from the common axis of said control disks, a first and a second rocker arm with said first rocker arm secured to said first control disk and to said first eccentric disk and said second rocker arm secured to said second control disk and to said eccentric disk, said transmission apparatus is arranged to be mounted on an off-the-road vehicle including a rigid carrier extending in the long direction of said rocker arms, said carrier arranged to act as track or wheel carrier, a connecting pin located adjacent each of the opposite ends of said carrier, said eccentric point of each said eccentric disk being located on one of said connecting arm having a pin extending therefrom at the end spaced from said control disks, each said eccentric disk rotatably mounted on a different one of said pins, a central pin located intermediate the ends of said carrier and rotatably supporting said control disks, said rocker arms are pivotally mounted on said central pin, hydraulic cylinders arranged to be secured to the chassis of the vehicle, said hydraulic cylinders including piston rods engaged with a different one of said rocker arms, and said drive means connecting said first control disk to said second eccentric disc and said second control disk to said first eccentric disk.

2. Transmission apparatus, as set forth in claim 1, wherein said drive means is one of a belt and cable.

3. Transmission apparatus, as set forth in claim 1, wherein said drive means is a toothed belt and said eccentric disk is a toothed wheel.

4. Transmission apparatus, as set forth in claim 1, wherein said drive means is a chain and said eccentric disk is a chain wheel.

5. Transmission apparatus, as set forth in claim 1, wherein said drive means is a toothed rack and said control disks and said eccentric disks each has a toothed circumferential periphery.

6. Transmission apparatus, as set forth in claim 2, 3, 4, 5 or 1, wherein each of said control disks and said eccentric disk comprises at least two disks parts with each of said disk parts of said control disk and eccentric disk having a different size.

7. Transmission apparatus, as set forth in claim 1, wherein the pivot axis of each said control disk is a stationary axis.

8. Transmission apparatus, as set forth in claim 9, wherein said rocker arm having a long axis extending between the first and second ends thereof, and said eccentric disk is in the neutral position when the long axis of said rocker arm extends through the center point and the eccentric point of said eccentric disk.

* * * * *